Patented July 11, 1950

2,514,856

UNITED STATES PATENT OFFICE 2,514,856

METHOD OF RENDERING TiO₂ BATCHES COLOR-UNIFORM

Donald R. Goetchius, Avon, and Edwin J. Kelly, Cleveland, Ohio, assignors to Ferro Enamel Corporation, Cleveland, Ohio, a corporation of Ohio No Drawing. Original application August 15, 1947, Serial No. 768,930. Divided and this application May 27, 1949, Serial No. 95,876

6 Claims. (Cl. 106—312)

This application is a division of our copending application Ser. No. 768,930 filed August 15, 1947.

This invention relates as indicated to titanium opacified porcelain enamels and also to the provision of a titanium-bearing opacifier which may be used in porcelain enamels and when so used, will give uniform results as to color effect even though the titanium may be derived from different naturally occurring sources and with different amounts of various impurities.

The use of titanium as an opacifier in porcelain enamels has been recognized as desirable for many years. It is more expensive than many of the more commonly used opacifying materials but it is preferable over the atter because of its high covering power or clouding effect and also because by its use a highly acid-resistant porcelain enamel may be produced.

Up to the time of our invention titanium dioxide was not used for opacifying purposes to any substantial extent in commercial production because of the difficulty of color-matching porcelain-enameled articles produced from different batches of commercially available titanium dioxide. The prior workers in the art found that whereas one batch of commercially available titanium dioxide when added to porcelain enamel produced a highly reflective product having a light cream color, another batch of the titanium dioxide added in the same amounts, in the same enamel, and all other conditions maintained the same would produce a product having a light bluish cast. Not only were these variations in color quite different but they were also entirely unpredictable. Some workers in the art believed that the color changes were due to minor amounts of iron present in the commercially produced titanium dioxide and oxidation or reduction of the melt. Improvements in refining technique resulting in the elimination of most of the iron did not, however, solve the problem. A report of an extensive investigation of the yellow discoloration of titanium-bearing enamels will be found in report No. BD—156 dated September 26, 1938 and published by the British Titan Products Company Limited. The workers who conducted that investigation suggested as the only remedy, aside from the reduction of the iron content to as low a percentage as possible, the use of small additions of antimony oxide. Aside from the fact that the addition of antimony oxide does not solve the problem and causes a reduction in opacity, the use of antimony is frowned upon and in certain instances prohibited in enamels which come in contact with food. In a subsequent report No. BD—228 by the same company under the authorship of S. G. Tinsley, other suggestions were made as a possible solution to the problem. However, none of such suggestions were found to be useful and effective in producing the same color effect when different batches of commercially produced titanium dioxide were employed.

As a result of extensive investigation of the composition of the commercially available batches of titanium dioxide and with particular regard to those impurities which occur in "trace" quantities and which are usually reported as "traces" in the analyses of commercially available batches of titanium dioxide, we have discovered that in the impurities lies the secret to the control of uniform color effect in porcelain enamels which are opacified by the use of titanium dioxide.

It is a principal object of our invention, therefore, to provide a method whereby the color effectiveness of commercially produced titanium dioxide may be standardized so that even though the normal color effectiveness of different batches of commercially available titanium dioxide would be quite different nevertheless the same color effect may be produced by the use of our invention.

Other and more specific objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the method of rendering different batches of commercially produced titanium dioxide, which may or may not contain minor amounts of at least one of the elements of tantalum, columbium and tungsten as impurities, uniform as to color effect when used as an opacifier for porcelain enamel by being smelted with the raw batch in producing the frit, which comprises adding to the different batches respectively such amounts of at least one of the elements tantalum, columbium and tungsten so that the total percentage of all of such elements in each of the batches is substantially the same.

The broad method of our invention is particularly applicable to different batches of commercially produced titanium dioxide which are substantially free of chromium.

Many manufacturers of porcelain enamel products require that the final product be essentially white with a slight bluish cast. It was found that that result could be secured by the use of certain batches of commercially available titanium dioxide whereas other batches of apparently the same composition produced an end product which had a decidedly cream tinge. As previously indicated, we therefor investigated the difference between the composition of those batches with particular regard to those elements whose presence is ordinarily not reported but which when requested in an analysis are usually reported as traces. By careful spectrographic quantative analysis for these "trace" impurities it was found that the aforesaid difference in color effectiveness of the different batches of the titanium dioxide was due to differences in the total amount within which the elements tantalum, columbium and tungsten were present. It was found that when the total amount of these elements was present to the extent of at least 0.2 per cent based on the total amount of titanium dioxide present, the porcelain enamel opacified by such titanium dioxide always had the desired bluish tinge. It was also found that when the total amount of these three elements was changed, the intensity of such bluish tint varied in almost direct proportion. Thus when the three named elements were present in a total amount of about 0.1 per cent the porcelain enamel end product had a substantially neutral white appearance as determined by carefully controlled reflectance tests using different colored filters. It was also found that when these three elements were either absent entirely or present in amount much less than 0.1 per cent, the enamel containing such opacifier had a decidedly creamy tinge.

Further investigation of these commercially available samples having different amounts of the three named elements present showed that when the total of the same was only 0.1 per cent and the enamel opacified thereby accordingly had a neutral white color, the desired bluish tinge could be imparted to the enamel by the addition of 0.1 per cent of any of the three elements. In one instance when the titanium dioxide contained a total of 0.1 per cent of tantalum, columbium and no tungsten, the desired bluish tinge was secured by the addition of 0.1 per cent of tungsten based on the amount of titanium dioxide.

Since the advent of our discovery as explained above, we have been able to produce uniform results as to color by using a wide variety of commercially available batches of titanium dioxide. When we receive a new batch of titanium dioxide, prior to the time it is used we first analyze the same quantatively by the spectrographic method and determine within 0.01 per cent the amount of columbium, tantalum and tungsten present. We then blend with such sample an amount of tungsten to bring the total of these three elements to a predetermined amount. For our purposes, we have standardized on a total quantity of the three elements of 0.2 per cent based on the amount of titanium dioxide present for the production of an enamel which has a slight bluish tinge and on a total amount of 0.1 per cent of the three named elements for an enamel which has a substantially neutral white color.

When the spectrographic analysis shows that the sample of titanium dioxide contains a total of less than .02 per cent of columbium, tantalum and tungsten then if there are no other coloring impurities present, the enamel opacified thereby will have a light cream tinge. The color of such an enamel may be adjusted to a neutral white by the addition of about 0.1 per cent of tungsten based on the amount of titanium dioxide, and if a definite bluish tinge is desired it may be secured by the use of about 0.2 per cent of tunsten based on the amount of titanium dioxide.

Amounts of the three critical elements in excess of a total of 0.2 per cent will give a bluish tinge which is too pronounced to be acceptable as a "white" enamel. Amounts of the three elements in excess of 0.2 per cent may be used, however, where for example the enamel composition is such that it has an unusually pronounced creamy tinge or when a more decided bluish tinge is desired.

Tungsten in the form of the oxide as the corrective addition agent is usually used because, of the three critical elements involved, it is the most readily available and can be secured at the lowest cost. The critical elements may be added in the form of any of the compounds thereof which will be soluble and be retained in the fused glass and will not add other harmful elements such as chromium or iron for example. Instead of adding an auxiliary amount of one of the three named elements such as tungsten the same results may be secured, of course, by the admixture of different batches of titanium dioxide which have different total amounts of the three critical elements naturally present therein. This expedient is particularly desirable for use in connection with batches of titanium dioxide which, as received, contain more than the optimum predetermined total amount of the three elements. Such a batch may be mixed with another batch in which the total amount of the three critical elements is below the optimum figure and by controlling the relative amounts of the two batches a composite product may be produced in which the total amount within which the three elements are present is at the desired value.

In our investigation of the amounts within which the various "trace" elements are present in commercial batches of titanium dioxide, we also discovered that the batches originally received by us contained varying and substantial quantities of chromium. It was also found that that element even in small amounts had a decided influence on the color effect of the titanium dioxide. The removal of chroumium is not difficult and may be readily reduced to the desired minimum in the commercial process for producing ceramic grade titanium dioxide. Therefore it is practical to obtain commercially titanium dioxide which is sufficiently low in chromium content.

The commercially produced titanium dioxide which has been substantially freed of chromium and which contains the properly adjusted total amounts of columbium, tantalum and tungsten, as above explained, may be used as an opacifier either as a smelter addition or as mill addition. Its use as a smelter addition is particularly desirable because of its effect in producing an enamel which is highly opaque and acid resistant. As a smelter addition it may be employed in an amount of from about 5 per cent to about 20 per cent of the total weight of the raw mix. The following is a range of percentages within which the various components of the raw mix may be employed in producing a series of enamels opacified with the improved opacifier of our invention.

*Table A*

| | |
|---|---|
| Dehydrated borax | 5-25 |
| Feldspar | 5-15 |
| Soda ash | 0-10 |
| Potash nitrate | 0-10 |
| Zinc oxide | 0- 5 |
| Mono ammonium phosphate | 0-25 |
| Sod. silica fluoride | 0-10 |
| Titanium dioxide | 5-20 |
| Silica | 0-40 |
| Talc | 0- 5 |
| Sodium nitrate | 0-15 |
| Potassium silica fluoride | 0-15 |
| Cryolite | 0-10 |

In the following table is given the raw batch composition of one enamel falling within the above range and which will be found to be a particularly useful enamel.

*Table B*

| | |
|---|---|
| Dehydrated borax | 17 |
| Feldspar | 9 |
| Soda ash | 2 |
| Potash nitrate | 9 |
| Zinc oxide | 2 |
| Sod. sil. fluoride | 5 |
| Titanium oxide (purified) | 18 |
| Silica | 38 |
| | 100 |

When the raw mix of Table B is smelted, the calculated oxide content of the frit produced therefrom will be approximately as follows:

*Table C*

| | |
|---|---|
| $Na_2O$ | 8.38 |
| $Al_2O_3$ | 1.62 |
| $SiO_2$ | 45.80 |
| $B_2O_3$ | 11.65 |
| $N_2O$ | 5.10 |
| $Al_2O_3$ | 1.62 |
| ZnO | 2.00 |
| F | 3.06 |
| $TiO_2$ | 18.00 |

The enamels of Tables B and C should be smelted at a temperature of approximately 2250° F. The frit produced therefrom may be employed with the mill additions given in Table D.

*Table D*

| | | |
|---|---|---|
| Frit | pounds | 100 |
| Enamelers clay | do | 5 |
| Titanium oxide purified | do | 1 |
| Potash carbonate | ounces | 8 |
| Water | pounds | 38 |

The mill charge given in Table D above, milled to a fineness such that 1 to 2 per cent will remain on a 200 mesh screen, may be advantageously employed at a weight of application of about 15 grams to 30 grams per square foot applied over a regular ground coat. A single coat of 20 grams per square foot will be found to produce a satisfactory finish for articles such as stove parts, refrigerator parts and kitchenware. A plurality of coats of this same enamel or as a finish coat over an intermediate coat of an other type of white enamel may be employed for the production of a slightly better finish such as may be required for example on articles such as sanitary ware.

The frit produced by the use of our improved opacifier as a smelter addition is characteristically transparent like all of the titanium bearing enamels which are suddenly quenched from an elevated temperature, i. e. the titanium dioxide is in solution in the glass matrix. Upon fusing the enamel the titanium dioxide will crystalize mostly in the anatase form. Such crystalization usually occurs during the firing of the enamel in its application to the ware. By the use of our improved opacifier in which the total amount of columbium, tantalum and tungsten is equal to about .2 per cent of the titanium dioxode content, we have been able to secure in a single coat of application, an enamel of a desirable blue-white color with a reflectance as high as 78 per cent.

The mechanics by which this balance between the amount of titanium dioxide and the total amount of tungsten, tantalum, and columbium present produces the stated and desired effect is not fully understood. It is known that the effect which is thus secured is not the same as that secured by the use of a conventional coloring oxide such as cobalt oxide. There is some evidence that the three critical trace elements have a strong effect on the crystal growth of titanium dioxide as it crystalizes in the glass matrix during the firing of the enamel on the ware. We are convinced that the three critical trace elements, tantalum, columbium and tungsten, when present in an amount of about .1 to .2 per cent very substantially reduce the crystal size of the titanium dioxide as it precipitates in the enamel on firing. The decrease in crystal size results in a slight loss of opacity and a change of color to the bluish white tint.

It has also been suggested that these three critical elements, tantalum, columbium and tungsten, have a strong influence in reducing the state of oxidation of the titanium dioxide to one of its blue oxides. These properties, i. e. of controlling crystal size and the state of oxidation of the titanium, are ones which are not possessed by any of the conventional coloring oxides such as cobalt oxide.

An attempt to control the color of the fired enamel by the addition of a coloring oxide either to the melt or to the mill addition to give a bluish cast will usually result in off-shade greenish whites. An excessive lowering of reflectance will also occur.

Throughout the appended claims we have referred to different batches of "commercially produced" titanium dioxide. There are a large number of patents which disclose various ways of producing titanium dioxide. A notable example is Patent No. 1,932,087 issued to Richter, October 24, 1933. Another example of a somewhat different method is given in the patent to Rossi et al. No. 1,106,406 dated August 11, 1914. Regardless of the method employed, most commercially available batches of titanium dioxide will contain minor amounts of tantalum, columbium, and tungsten in direct proportion to the amount of those elements present in the mineral from which the refined product is derived, since none of the commercially available processes for the production of defined titanium dioxide will remove any substantial amounts of columbium, tantalum and tungsten, and in any event will leave "trace" amounts of such elements present.

Other modes of applying the principle of the invention may be employed, change being made as regards the details described, provided the features stated in any of the following claims or the equivalent of such be employed.

We therefore particularly point out and distinctly claim as our invention:

1. The method of rendering different batches of commercially produced titanium dioxide uniform as to color effect when used as an opacifier for porcelain enamels which comprises first determining the total amount of tantalum, columbium, and tungsten present as impurities in said titanium dioxide, and then adding to said titanium dioxide at least one of the elements selected from the group consisting of tantalum, columbium and tungsten so that the total percentage of all said elements in each of the batches is from about 0.1% to about 0.2%, said total percentage of all said elements in each of the titanium dioxide batches having substantially the same value.

2. The method of rendering different batches of commercially produced titanium dioxide uniform as to color effect when used as an opacifier for porcelain enamels which comprises first determining the total amount of tantalum, columbium and tungsten present as impurities in said titanium dioxide, and then adding to said titanium dioxide at least one of the elements selected from the group consisting of tantalum, columbium and tungsten so that the total percentage of all said elements in each of the titanium dioxide batches is about 0.2%.

3. The method of rendering different batches of commercially produced titanium dioxide uniform as to color effect when used as an opacifier for porcelain enamels which comprises first determining the total amount of tantalum, columbium and tungsten present as impurities in said titanium dioxide, and then adding to said titanium dioxide at least one of the elements selected from the group consisting of tantalum, columbium and tungsten so that the total percentage of all said elements in each of the titanium dioxide batches is about 0.1%.

4. The method of rendering different batches of commercially produced titanium dioxide, which are substantially free of chromium, uniform as to color effect when used as an opacifier for porcelain enamels which comprises first determining the total amount of tantalum, columbium and tungsten present as impurities in said titanium dioxide, and then adding to said titanium dioxide an amount of tungsten to bring the total percentage of all said elements in each of the titanium dioxide batches to about 0.2%.

5. The method of rendering different batches of commercially produced titanium dioxide, which are substantially free of chromium, uniform as to color effect when used as an opacifier for porcelain enamels which comprises first determining the total amount of tantalum, columbium and tungsten present as impurities in said titanium dioxide, and then adding to said titanium dioxide an amount of tungsten to bring the total percentage of all said elements in each of the titanium dioxide batches to about 0.1%.

6. In a method of rendering different batches of commercially produced titanium dioxide, refined from naturally occurring ores containing trace amounts of various impurities, uniform as to color effect when used as an opacifier for porcelain enamels and in which the total amount of tantalum, columbium, and tungsten remaining as impurities in each batch of titanium dioxide as thus refined has been determined, the step comprising adding enough of at least one of the elements selected from the group consisting of tantalum, columbium and tungsten so that the total percentage of all said elements in each titanium dioxide batch is from about 0.1% to about 0.2%, said total percentage of all said elements in each of such titanium dioxide batches having substantially the same value.

DONALD R. GOETCHIUS.
EDWIN J. KELLY.

REFERENCES CITED

The following references are of record in the file of this patent:

UNITED STATES PATENTS

| Number | Name | Date |
| --- | --- | --- |
| 2,116,623 | Flint | May 10, 1938 |
| 2,200,373 | Oppegaard | May 14, 1940 |